(12) United States Patent
Rau

(10) Patent No.: US 8,177,946 B2
(45) Date of Patent: May 15, 2012

(54) ELECTROCHEMICAL FORMATION OF HYDROXIDE FOR ENHANCING CARBON DIOXIDE AND ACID GAS UPTAKE BY A SOLUTION

(75) Inventor: Gregory Hudson Rau, Castro Valley, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 957 days.

(21) Appl. No.: 12/184,748

(22) Filed: Aug. 1, 2008

(65) Prior Publication Data

US 2009/0038955 A1   Feb. 12, 2009

Related U.S. Application Data

(60) Provisional application No. 60/964,288, filed on Aug. 9, 2007.

(51) Int. Cl.
C25B 1/20 (2006.01)
(52) U.S. Cl. ............... 204/242; 204/275.1; 205/508
(58) Field of Classification Search ................. 205/508; 204/242, 275.1
See application file for complete search history.

(56) References Cited

U.S. PATENT DOCUMENTS

| | | | |
|---|---|---|---|
| 6,375,825 B1 * | 4/2002 | Mauldin et al. | ............... 205/508 |
| 6,890,497 B2 | 5/2005 | Rau et al. | |
| 2005/0011770 A1 | 1/2005 | Katsuyoshi et al. | |
| 2006/0185985 A1 | 8/2006 | Jones | |

FOREIGN PATENT DOCUMENTS

GB   205955 A   11/1923

OTHER PUBLICATIONS

Baciocch, Renato, "Process design and energy requirements for the capture of carbon dioxide from air", Chemical Engineering and Processing 45 (2006)1047-1058.
Nikulshina, V., CO2 capture from air and co-production of H2 via the Ca(OH)2-CaCO3 cycle using concentrated solar power-Thermodynamic analysis, Energy 31 (2006) 1715-1725.

* cited by examiner

*Primary Examiner* — Arun S Phasge
(74) *Attorney, Agent, or Firm* — Eddie E. Scott

(57) ABSTRACT

A system is described for forming metal hydroxide from a metal carbonate utilizing a water electrolysis cell having an acid-producing anode and a hydroxyl-producing cathode immersed in a water solution of sufficient ionic content to allow an electric current to pass between the hydroxyl-producing cathode and the acid-producing anode. A metal carbonate, in particular water-insoluble calcium carbonate or magnesium carbonate, is placed in close proximity to the acid-producing anode. A direct current electrical voltage is provided across the acid-producing anode and the hydroxyl-producing cathode sufficient to generate acid at the acid-producing anode and hydroxyl ions at the hydroxyl-producing cathode. The acid dissolves at least part of the metal carbonate into metal and carbonate ions allowing the metal ions to travel toward the hydroxyl-producing cathode and to combine with the hydroxyl ions to form the metal hydroxide. The carbonate ions travel toward the acid-producing anode and form carbonic acid and/or water and carbon dioxide. Among other uses, the metal hydroxide formed can be employed to absorb acid gases such as carbon dioxide from a gas mixture. The invention can also generate hydrogen and oxidative gases such as oxygen or chlorine.

9 Claims, 7 Drawing Sheets

ELECTROCHEMICAL FORMATION OF HYDROXIDE FOR ENHANCING CARBON DIOXIDE AND ACID GAS UPTAKE BY A SOLUTION

CROSS-REFERENCE TO RELATED APPLICATIONS

This application claims the benefit of U.S. Provisional Patent Application No. 60/964,288 for "Electrochemical Formation of Hydroxide for Enhancing Carbon Dioxide and Acid Gas Uptake by a Solution" filed Aug. 9, 2007 by Gregory Hudson Rau. U.S. Provisional Patent Application No. 60/964,288 for "Electrochemical Formation of Hydroxide for Enhancing Carbon Dioxide and Acid Gas Uptake by a Solution" filed Aug. 9, 2007 by Gregory Hudson Rau is incorporated herein by this reference.

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present invention relates to the electrochemical formation of hydroxide. More particularly the present invention relates to electrochemical formation of hydroxide from mineral carbonate for enhancing carbon dioxide and acid gas uptake by a solution. The invention can also generate hydrogen gas and oxidative gases such as oxygen or chlorine.

2. State of Technology

Due to the climate and environmental effects of excess carbon dioxide ($CO_2$) in the atmosphere, a variety of methods exist or have been proposed for pre- or post-emission capture and sequestration of $CO_2$. For example, it is well known that $CO_2$ will react with hydroxides in solution such that the $CO_2$ contained in a gas mixture in contact with such a solution will be reduced via absorption and reaction within the solution, and such reactions have industrial applications. More recently the use of solutions containing calcium hydroxide ($Ca(OH)_2$) or sodium hydroxide (NaOH) have been proposed for large-scale chemical absorption of air $CO_2$ using various means of active or passive contacting of air or a gas mixture and the solution. For example, Kheshgi (Kheshgi, H. S. Sequestering atmospheric carbon dioxide by increasing ocean alkalinity. *Energy* 1995, 20, 915-922) suggested placing calcium oxide (CaO) or $Ca(OH)_2$ in the ocean to effect passive uptake of $CO_2$ from the atmosphere, largely forming calcium bicarbonate ($Ca(HCO_3)_2$) in solution as the $CO_2$ storage product. Other schemes employ engineered structures for the contacting of air with NaOH, forming sodium carbonate ($Na_2CO_3$) in solution (e.g., Zeman, F. Energy and material balance of $CO_2$ capture from ambient air *Environ. Sci. Technol.* 2007, 41, 7558-7563; US Patent Application 2006/0051274 A1; US Patent Application 2006/0093540 A1). By subsequently reacting this solution with $Ca(OH)_2$, calcium carbonate ($CaCO_3$) is formed and NaOH is regenerated. The $CaCO_3$ is then calcined at high temperature to form concentrated $CO_2$ as the final storage product while also forming CaO. The latter is then hydrated to regenerate $Ca(OH)_2$. In this way alkaline hydroxide solutions are recycled and conserved, as opposed to the once-through production and release of alkalinity in the concept proposed by Kheshgi. However, in both cases significant quantities of thermal energy are required to either produce or regenerate the hydroxide solutions, especially the calcination of $CaCO_3$. This contributes significantly to the cost of either process, plus additional $CO_2$ is produced if the source of the thermal energy is derived from the combustion of fossil fuels.

Another source of hydroxide is electrochemical salt splitting wherein a dissolved salt is split into acid and hydroxide components in the presence of a charged anode and cathode, respectively. For example a solution containing dissolved sodium chloride (NaCl) can be electrolyzed to form hydrochloric acid (HCl), hypochlorite ($ClO^-$), chlorate ($ClO_3^-$), and/or chlorine gas ($Cl_2$) at the anode and NaOH at the cathode. The hydroxide solution can then be removed for subsequent use. Obviously, such electrochemically-produced hydroxide solutions could be used for $CO_2$ and other acid gas mitigation (e.g., U.S. Pat. Nos. 3,344,050, 3,692,649, 3,801,698; US Patent Application 2006/0185985). However, producing hydroxide in quantities sufficient for large scale $CO_2$ removal could, in the case of a metal chloride-containing electrolyte, mean massive co-production of one or more chlorine-containing compounds. If these were not consumed in appropriate ways they would pose a significant environmental impact.

U.S. Pat. No. 4,337,126 discloses electrolysis of carbonates to produce hydroxides. The process is directed to electrolytic production of hydroxides of alkali metal from alkali metal carbonates contained in waste streams and naturally occurring carbonate and/or bicarbonate deposits or ores. Alkali metal carbonates are produced as by-products in a variety of processes which rely on other alkali metal salts or alkali metal hydroxides as reactants or as treating agents. However, the alkali metal carbonates used, in particular potassium carbonate, are introduced into the process in dissolved form and therefore preclude the use of more abundant but insoluble alkali metal carbonates such as calcium carbonate or magnesium carbonate. $CO_2$ production rather than $CO_2$ mitigation is effected by the invention.

U.S. Pat. No. 5,246,551 discloses electrochemical methods for production of alkali metal hydroxides without the co-production of chlorine. Alkali metal hydroxides are manufactured in the United States at the rate of approximately 36,500 tons/day, almost entirely by the electrolysis of aqueous brine solutions, but resulting in the co-production of chlorine. Aqueous solutions of alkali metal carbonates and bicarbonates are used in the invention, in particular sodium carbonates and bicarbonates, requiring that the alkali metal carbonates and bicarbonates be in dissolved form prior to introduction to the system. This precludes the use of water insoluble alkali metal carbonates such as calcium or magnesium carbonate that can be much more abundant and less expensive than water soluble forms for large scale applications. $CO_2$ is also produced rather than mitigated by this process.

United States Published Patent Application No. 2006/0185985 discloses removing carbon dioxide and other pollutants from a gas stream by contacting with an electrochemically generated hydroxide solution to form metal carbonate and/or bicarbonate. However, in this case the metal source for the produced hydroxide solution is derived from a soluble metal chloride salt, in particular sodium chloride, requiring the formation of chlorine-containing compounds.

The referenced shortcomings of the preceding methods of hydroxide production and $CO_2$ mitigation are not intended to be exhaustive, but rather are among those that impair or limit their application. A number of these shortcomings are overcome by the techniques described and claimed in this disclosure.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides an electrochemical system for splitting of metal carbonate, for example calcium carbonate as contained in natural minerals such as limestone, and forming dissolve metal hydroxide. Such hydroxides have wide use in various industrial, chemical, manufacturing, agricultural, aquacultural, and environmental applications. For example, such hydroxides can be used as a chemical feedstock, used for control or neutralization of acidity, and used for effecting the flocculation and precipitation of carbonates or other compounds. In one embodiment the invention employs such hydroxide for absorbing, neutralizing, and storing carbon dioxide or other acid gases.

In one embodiment the present invention forms metal hydroxide in the course of electrolyzing a water solution. This involves the steps of providing: a water electrolysis cell having an acid-producing anode and a hydroxyl-producing cathode; a water solution of sufficient ionic content to allow an electric current to pass between the hydroxyl-producing cathode and the acid-producing anode submerged in the solution; placing a metal carbonate in close proximity to the acid-producing anode; a direct current electrical voltage across the acid-producing anode and the hydroxyl-producing cathode sufficient to generate acid at the acid-producing anode and hydroxyl ions at the hydroxyl-producing cathode; acid dissolution of at least part of the metal carbonate into metal and carbonate ions and allowing the metal ions to travel toward the hydroxyl-producing cathode, combining with the hydroxyl ions to form the metal hydroxide, and allowing the carbonate ions to travel toward the acid-producing anode to form carbonic acid and/or water and carbon dioxide.

One embodiment of the present invention provides a system for removing carbon dioxide from the atmosphere or other gas mixtures. This embodiment includes the system described above where the metal hydroxide solution formed is contacted with atmospheric $CO_2$ or other $CO_2$-containing gas mixture in order to absorb and remove some or all $CO_2$ from such gas mixtures. This proceeds via reaction of the excess metal hydroxide with $CO_2$ or its hydrated form, carbonic acid, to form metal carbonate or, more preferably for $CO_2$ absorption purposes, metal bicarbonate. Such metal carbonates or bicarbonates can be used to store or sequester carbon from the atmosphere or other gas mixture, and/or may have other industrial, chemical, or environmental uses. By analogy it is understood that the preceding system is relevant for absorbing and neutralizing other gases whose hydrated or unhydrated forms can react with metal hydroxide to form metal salts of those gases. Such gases include acid gases such as $SO_2$, $H_2S$, and $NO_2$.

Other embodiments of the invention place the formed metal hydroxide solution in a separate, natural or artificial gas-solution contactor to facilitate $CO_2$ or acid gas removal from a gas mixture. This includes the use of a natural or artificial water body as both the source of the initial solution to be electrolyzed as well as the recipient of the metal hydroxide solution produced. In this way the hydroxide once place in the water body is passively contacted with the air or a gas mixture at the water body's surface thus absorbing $CO_2$ or other acid gases from the atmosphere. Such water bodies include oceans, bays, lagoons, saline lakes and any other body of water whose natural salinity affords electrolysis of water. Underground saline water may also be used for this purpose where it is electrolyzed in the presence of metal carbonate, and the resulting metal hydroxide solution contacted with the atmosphere or other gas mixture using made-made apparatus or natural or artificial water bodies as contactors. Once acid gas absorption has thus been achieved by any of the preceding systems, the resulting metal carbonate or bicarbonate-enriched solution can be left in solution, removed and used for various chemical, industrial, manufacturing, or environmental purposes, or discarded.

Hydrogen gas ($H_2$) is produced as a consequence of the water electrolysis, and this gas is collected and can be used as a chemical feed stock or fuel. Note that because a $CO_2$-absorbing solution (hydroxide) is produced simultaneously with the $H_2$, certain embodiments of this invention will consume $CO_2$ while generating $H_2$. That is, the $H_2$ production process is carbon consumptive or "carbon-negative", in contrast to the direct or indirect production of significant quantities of $CO_2$ in the present-day commercial manufacture of $H_2$ ("carbon-positive" $H_2$).

In other embodiments, the $H_2$ produced is oxidized in a fuel cell or internal combustion engine, generating electrical, chemical, and/or thermal energy. If, for example, the oxidant is oxygen ($O_2$), the end product is water. If the oxidant is chlorine gas ($Cl_2$), the end product is hydrochloric acid (HCl). Oxidative gases such as $O_2$ or $Cl_2$ can be produced in the course of the invention's solution electrolysis and these gases can be used for the preceding $H_2$ oxidation or for other uses. Note that as in the case of $H_2$ generation above, certain embodiments of the invention will allow the production of $O_2$ or $Cl_2$ to be carbon-negative, in contrast to current commercial production methods of these gases. On the other hand, the reduction or elimination of such gas emissions from the electrolysis can be accomplished via the use of gas diffusion electrodes, air electrodes, certain electric current densities, or by other methods.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
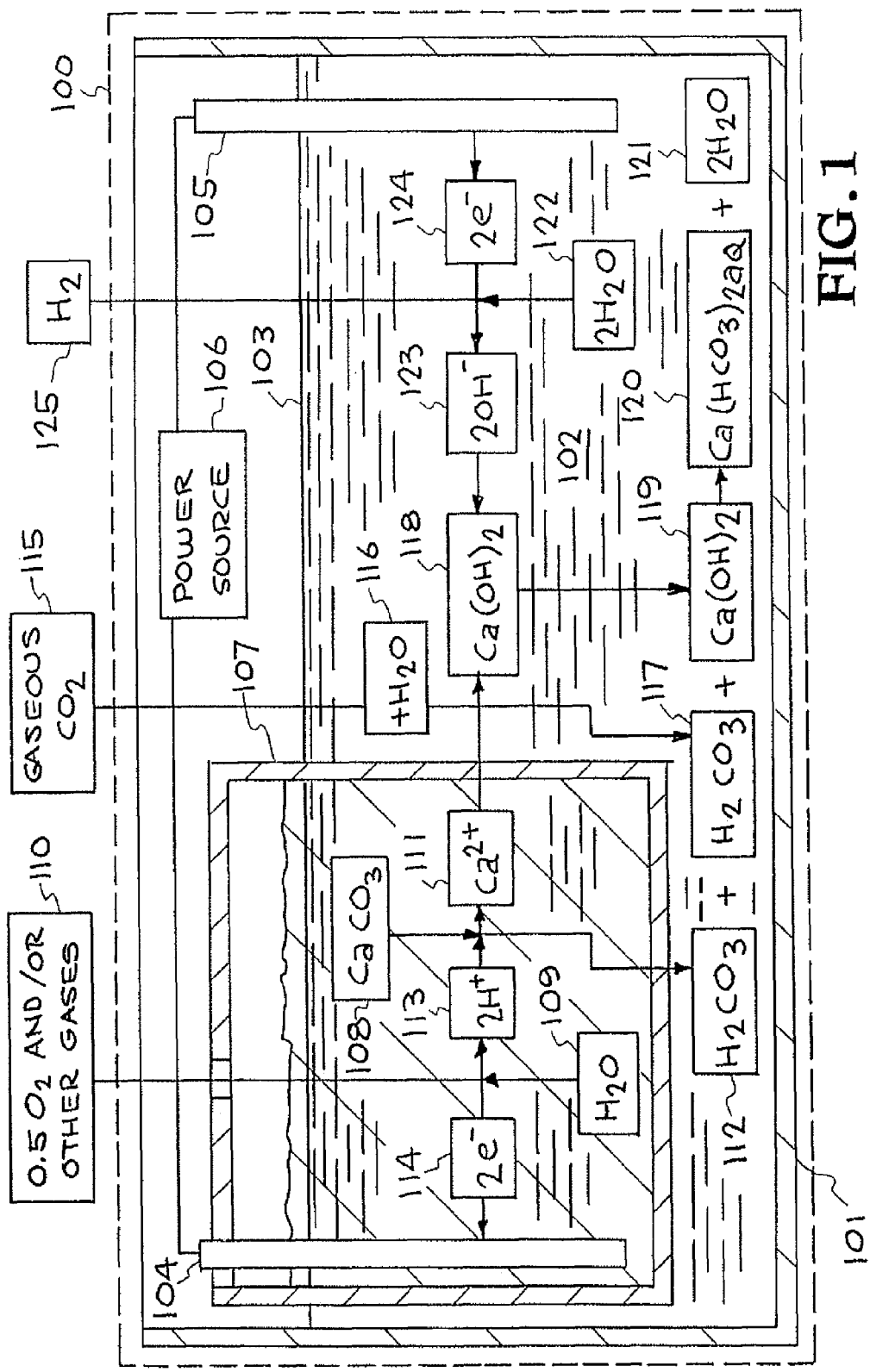
FIG. 1 is an illustration of one embodiment of a system constructed in accordance with the present invention.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring to the drawings and in particular to FIG. 1 a schematic representation of one embodiment of a system constructed in accordance with the present invention is shown. FIG. 1 provides a diagrammatic representation of a system of electrochemically generating metal hydroxide in solution via electrolysis of water in the presence of a metal carbonate. "Metal" here is defined as any element in the group IA, IIA, IIIA, IVA, IB, IIB, IIIB, IVB, VB, VIB, VIIB, or VIIIB elements of the periodic table where the metal can exist in the forms of metal carbonate and metal hydroxide. The resulting metal hydroxide is used to absorb acid gas from the overlying air space, producing metal salts of the acid gases. The system also generates hydrogen and other gases. The initial system is bounded by a dashed line and designated with the reference numeral 100.

The system 100 provides a method of forming metal hydroxide using the following elements; an acid-producing anode, a hydroxyl-producing cathode, a water solution that contains ions of sufficient quantity to allow electricity to pass through the solution and to split water; a direct current electrical power source 106 of sufficient voltage and current to allow the splitting of water in the solution into hydrogen ions (acid) at the cathode and hydroxyl ions at the anode, the hydrogen ions being of sufficient concentration to dissolve metal carbonate; a mass of metal carbonate in close proximity to the acid-producing anode; impressing an electrical voltage across the anode and the cathode sufficient to generate acid at the anode and hydroxyl ions at the cathode, the acid generated at the anode being of sufficient concentration to dissolve at least some of the metal carbonate into metal and carbonate ions. The resulting positively charged metal ions then travel toward the cathode and combine with the hydroxyl ions produced there to form metal hydroxide, while the carbonate ions migrate toward the acid-producing anode to form carbonic acid and/or water and carbon dioxide.

The system 100 utilizes a porous metal carbonate container 107 to facilitate the positioning of the metal carbonate near or around the anode 104 under circumstances where the metal carbonate remains in solid or particulate form when placed in the water solution 102. The porosity of the container is such that water molecules and other ions can pass through part or all of the walls of the container 107, but insoluble particles will be retained within the container 107. The porous carbonate container wall can be a membrane, cloth, matrix, grate, filter, sieve, web, screen, or other form of porous material capable of holding solids. All or part of the top surface of the container 107 may be left open to facilitate gas collection or release, to allow replenishment of metal carbonate, and to allow access to the anode 104 if positioned inside the container. The container 107 is filled with pieces or particles composed partly or entirely of metal carbonate, in this example calcium carbonate 108, and the container submerged and positioned in the water solution 102 such that the solution level 103 is below the top of the calcium carbonate mass 108 in the container 107. A cathode 105 is also partially submerged in the water solution 102.

The water solution 102 containing the anode 104 and cathode 105 resides in a larger container 101 capable of holding the water solution 102. The container 101 could be the ocean or a natural or artificial pond, river, stream, reservoir, vessel, cell, or other natural or artificial body capable of holding the water solution 102. The water solution 102 has an ionic content that is initially high enough to allow electricity to flow between the anode and cathode, the electricity being of sufficient current and voltage to allow the electrochemical splitting of water. The water solution 102 either: 1) naturally has sufficient ion concentration, for example seawater, saline ground water, or saline surface water, or 2) is artificially made sufficiently saline by the addition salt ions or by the removal of water (evaporation, desalination, electrodialysis, pressure dialysis, or by other methods). Such salt ions can be metal or non-metal chlorides, sulfates, nitrates, phosphates, carbonates, or any other ions capable of carrying electrical current within the solution.

Electricity is applied from a DC electricity power source 106 through the solution 102 via the anode 104 and cathode 105. Water molecules 109 in the solution 102 are subsequently split into hydrogen ions 113 and molecular oxygen 110, with the resulting electrons 114 transferred to the anode 104. The hydrogen ions 113 then chemically react with the calcium carbonate 108 to form carbonic acid 112 and calcium ions 111. Being positively charged, the calcium ions 111 migrate towards the negatively charged cathode 105. The calcium ions 111 combine with the hydroxyl ions 123 formed at the cathode 105 to produce calcium hydroxide 118, while the carbonate ions combine with hydrogen ions 113 produced at the anode 104 to form carbonic acid and/or water and carbon dioxide 112.

In one embodiment the metal hydroxide formed, in this example calcium hydroxide 118, can be used to subsequently react with the carbonic acid and $CO_2$ 112 and 117 dissolved in the solution, forming primarily dissolved metal bicarbonate 120 when the solution pH is maintained below 9, and predominantly metal carbonate when above pH 9. Under circumstances where metal bicarbonate formation dominates, the carbonic acid 112 formed at the anode 104 is quantitatively insufficient to react with all of the metal hydroxides 118 produced in the solution. The excess metal hydroxide is then free to react with any additional $CO_2$ dissolved in the solution. As this consumption of dissolved $CO_2$ reduces the solution's dissolved $CO_2$ concentration below the saturation state allowed by the overlying gas mixture (e.g., air), some $CO_2$ 115 will diffuse from the gas into the water solution 102, will be hydrated to form carbonic acid 117, and will react with the metal hydroxide 119 to form metal bicarbonate 120. The net effect is that there will be transfer of $CO_2$ from the overlying gas 115 to the solution, and the $CO_2$ concentration in the overlying gas 115 is thus reduced. By analogy this method can be used to reduce the concentration of other gases that can dissolve in water and can react with the metal hydroxide produced 118. Those gases include certain oxides of sulfur and nitrogen such as $SO_2$ and $NO_2$, as well as $H_2S$. Potential co-benefits of this system include the generation of $H_2$ 104 and $O_2$ and/or other oxidative gases 110 such as $Cl_2$.

In the system 100, the anode 104 and cathode 105 can be composed of materials that do not chemically react with the solution or its constituents, including those composed of graphite, stainless steel, nickel, titanium, tungsten, or platinum. The anode 104 may be composed of a material that preferentially discharges oxygen gas from the electrolyzed water solution rather than other gases. Additionally, it is possible to reduce or eliminate gas emission from the electrolyzed water solution by diverting the hydrogen gas 125 produced at the cathode 105 such that it bathes the anode and is oxidized by contact with the chemical constituents produced at the anode 104.

In the system 100, the metal carbonate can be of the type that is insoluble or sparingly soluble in the solution prior to the application of electricity, such as calcium carbonate and magnesium carbonate as contained in carbonate minerals such as limestone and dolomite. The metal carbonate can be in particulate, granular, or powdered form so as to allow the water solution and ions to pass through and contact the metal carbonate mass and the anode.

In the system 100, the acid gases such as $CO_2$ 115 that are absorbed by the solution 102 can initially reside in a gas stream or parcel, the gas being air or other gas from a natural origin, or the gas being from an industrial, waste, or other anthropogenic source. The gas may be either passively exposed to the solution or may be actively contacted with the solution by the use of bubbling, stirring, spaying, shaking, mixing, and the like. The addition of certain enzymes to the solution can also be used to facilitate gas transfer into the solution, for example the addition of carbonic anhydrase to enhance $CO_2$ uptake by the solution.

In the system 100, the hydrogen 125, oxygen, chlorine and/or other gases 110 generated by system 100 can be collected and can be used for chemical or industrial processes or for other purposes, can be stored, or can be discarded. Note that the simultaneous production of $H_2$ and oxidative gases with the co-production of a $CO_2$-consuming metal hydroxide solution allows for the production of $H_2$ and oxidative gas to be $CO_2$-consumptive. This is opposed to conventional $H_2$ and oxidative gas production that is $CO_2$-emissions-intensive. The metal hydroxide produced 118 can be used for purposes other than enhancing acid gas absorption by the solution 102. Such purposes include use as a chemical feed stock, the neutralization of acidity, and the elevation of solution pH, for example to effect precipitation of compounds contained in a solution, in particular metal carbonates and hydroxides. Such carbonates and/or hydroxides can be used, for example, in the production of cement. The electricity used in system 100 can be derived from the combustion of fossil fuel and/or from non-fossil energy including wind, solar, hydro, wave, tidal, ocean thermal, geothermal, geochemical, biochemical, biomass, or nuclear energy. Non-fossil energy is preferred if maximum net $CO_2$ mitigation by the system is desired.

Figure 2:
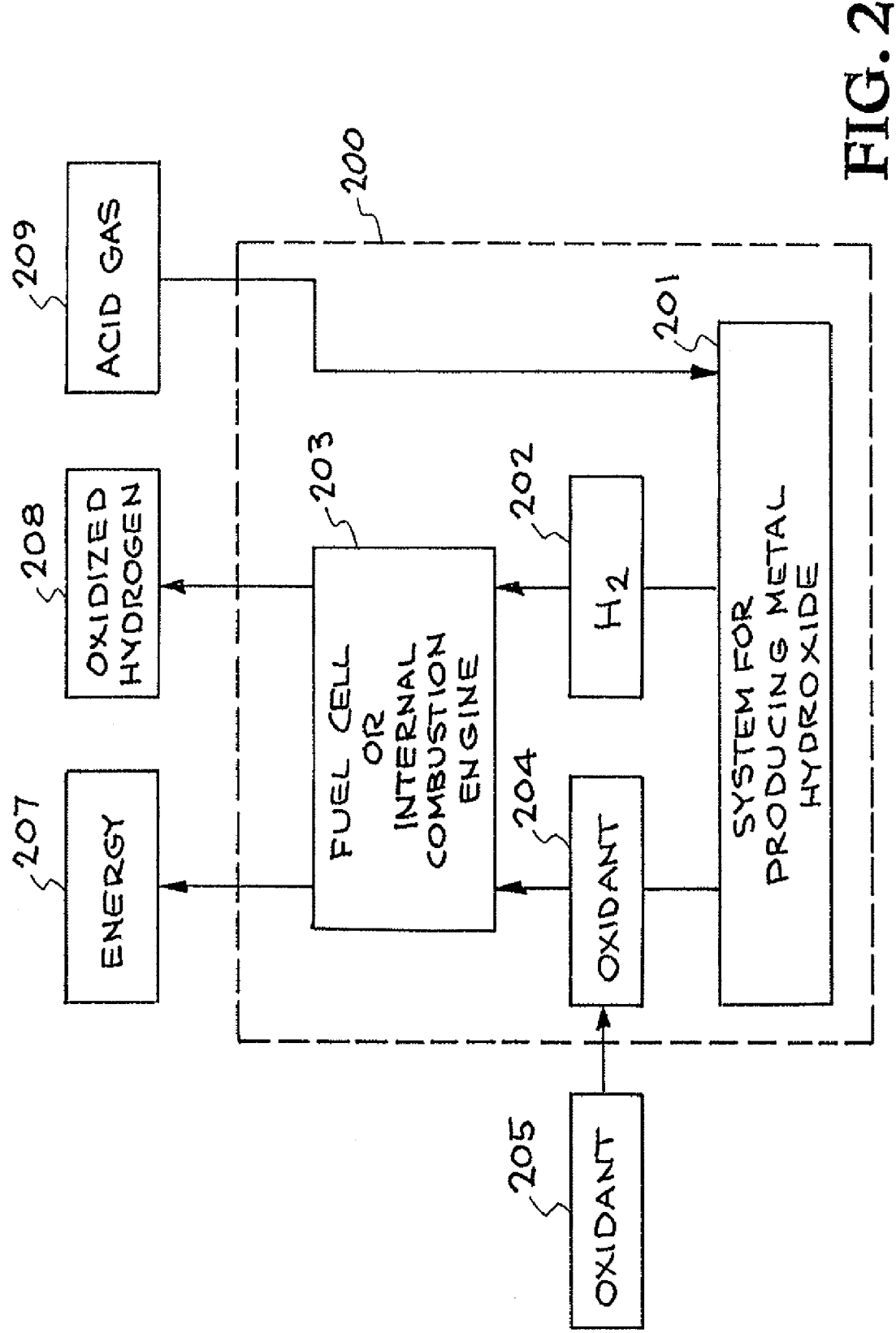
FIG. 2 illustrates another embodiment of a system constructed in accordance with the present invention.

Referring now to FIG. 2, a diagrammatic representation of another embodiment of a system constructed in accordance with the present invention is shown. This system is designated generally by the reference numeral 200. The system 200 provides a system for oxidizing the $H_2$ generated from system 100 for the purpose of generating energy and producing oxidized forms of hydrogen, in particular water or acids such as hydrochloric acid.

The system 200 includes the unit 201, a system of electrochemically generating excess metal hydroxide in solution via electrolysis of water in the presence of a metal carbonate, generating hydrogen and other gases. Among other uses, the metal hydroxide produced can be used to chemically absorb acid gases 209 (for example $CO_2$) from an overlaying headspace, thus producing metal salts of the acid gases. This unit 201 can be a system such as the system 100 described in connection with FIG. 1. Added to unit 201 is a unit 203 for oxidizing the hydrogen 202 produced by unit 201 for the purpose of generating electrical, mechanical, and/or thermal energy 207, and of generating oxidized hydrogen 208. The unit 203 includes a fuel cell or internal combustion engine for oxidizing or combusting the hydrogen 202. The oxidant 204 may include oxygen, chlorine, or other oxidative gas as produced by unit 201 and/or as provided from external sources 205. The oxidized hydrogen 208 may be in the form of water or acids such as hydrochloric acid, and is removed from the system and used, stored, or disposed of. Thus system 200 generates energy, potentially useful forms of hydrogen compounds, and metal hydroxides which can be employed for absorbing acid gases, or used for other purposes, or which can be stored or discarded.

Figure 3:
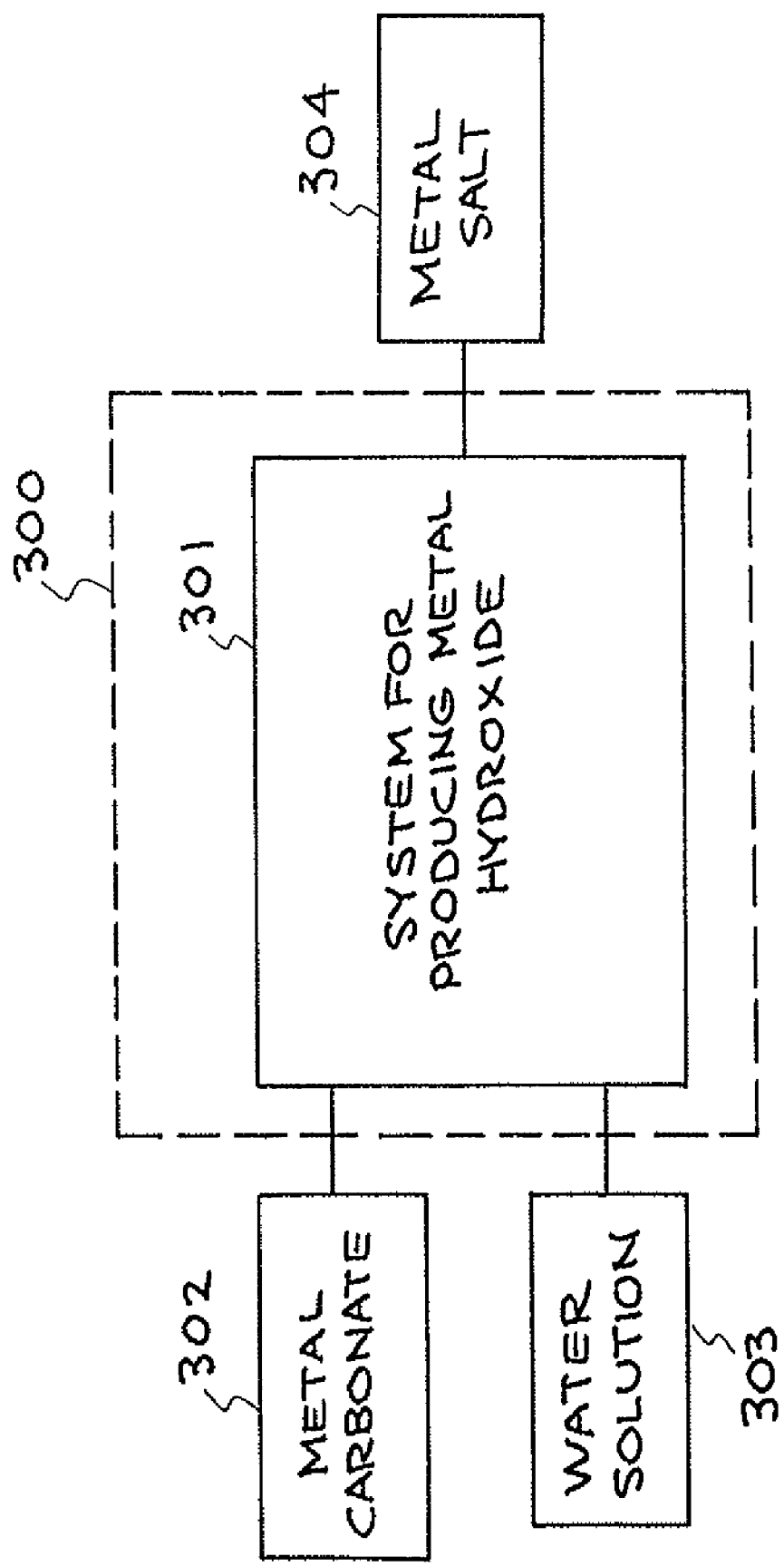
FIG. 3 illustrates another embodiment of a system constructed in accordance with the present invention.

Referring now to FIG. 3, a diagrammatic representation of another embodiment of a system constructed in accordance with the present invention is shown. This system is designated by the reference numeral 300. The system 300 includes a unit 301 that performs as previously described by either system 100 or system 200, but where a system is provided for the periodic or continuous addition to the system of metal carbonate 302 and water solution 303, and the periodic or continuous removal of metal salt 304 if produced from the reaction of acid gases with the metal hydroxide internally generated in systems 100 or 200. The water solution 303 and metal carbonate 302 are added to replenish the ions, water, and metal carbonate consumed by systems such as 100 and 200 where such consumption and depletion would otherwise negatively affect the desired performance of the invention. In turn, solid or dissolved metal salts 304 (such as previously described calcium bicarbonate, produced by systems such as 100 and 200), formed via aforementioned acid gas contact with the metal hydroxide solution, can be removed from system 300 and may be used for industrial, chemical, manufacturing, agricultural, aquacultural, environmental, or other uses, or may be stored or disposed of.

Figure 4:
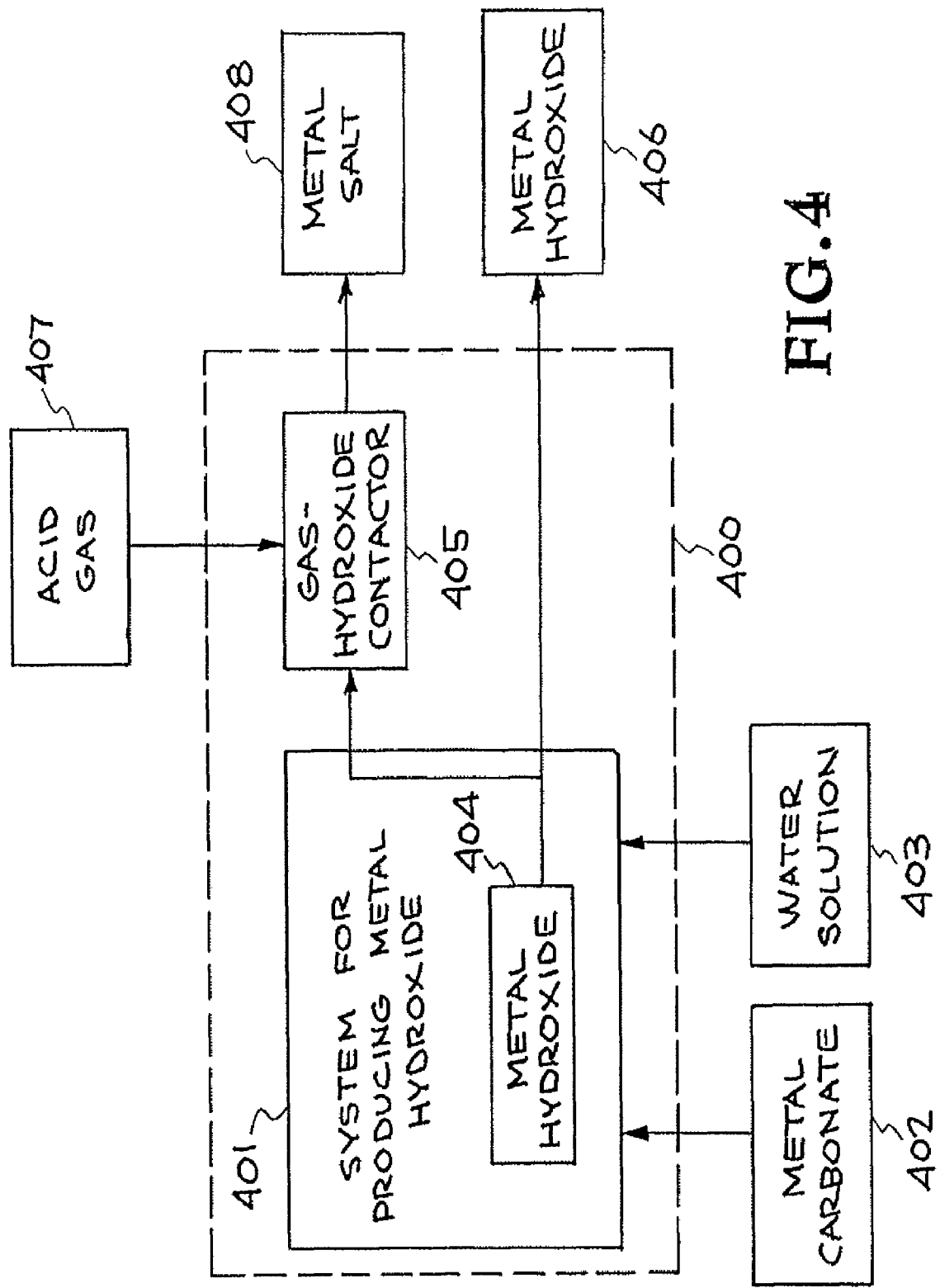
FIG. 4 illustrates yet another embodiment of a system constructed in accordance with the present invention.

Referring now to FIG. 4, a diagrammatic representation of another embodiment of a system constructed in accordance with the present invention is shown. This system is designated generally by the reference numeral 400. This system is composed of a unit 401 that performs as described for either system 100 or system 200, and where metal carbonate 402 and water solution 403 can be added as described by system 300. Unlike the previously described systems, however, the metal hydroxide 404 produced, such as calcium hydroxide, is periodically or continuously removed from unit 401 and: 1) placed in a gas-hydroxide contactor 405; 2) used for other purposes 406 including industrial, chemical, manufacturing, agricultural, aquacultural, or environmental mitigation purposes or 3) stored or disposed of. The gas-hydroxide contactor 405 is a natural or artificial structure whose purpose is to facilitate the chemical reaction and absorption of an acid gas 407 such as carbon dioxide from the air, waste gas stream, or other gaseous entity. The resulting solid or dissolved metal salt 408, e.g., dissolved calcium bicarbonate or carbonate, is removed from the contactor 405 and is used for industrial, chemical, manufacturing, agricultural, aquacultural, or environmental purposes, or is stored or disposed of. In this way system 400 allows for the removal of the metal hydroxide from systems 100 or 200 and for its use or disposal external from those systems.

Experimental Demonstration

Figure 5:
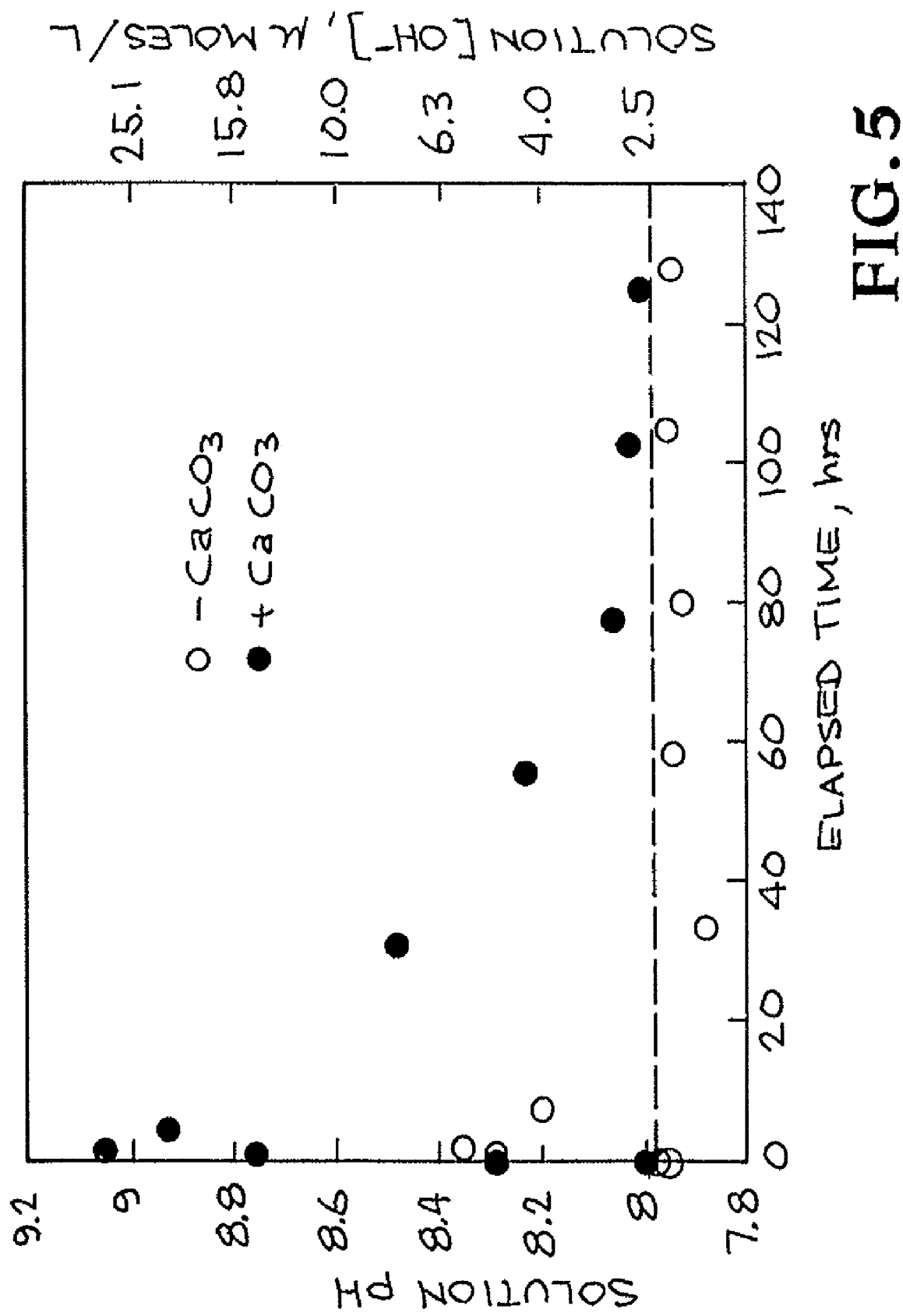
FIG. 5 is a graph illustrating the results of an experimental demonstration of the present invention.

Referring now to FIG. 5, a graph illustrates the results of an experimental demonstration of the present invention. The FIG. 5 graph shows the time course of seawater pH during 1.5 hrs of electrolysis using an anode that either was or was not encased in seawater-saturated $CaCO_3$ powder, followed by 5 days of solution exposure to ambient air. The corresponding solution [OH$^-$]=10$^{pH-7.6}$ at a mean experiment temperature of 16.5° C. and salinity of 35 ppt. Dashed line denotes pretreatment values.

In the experimental demonstration Applicant placed a 9 cm×1 mm diameter graphite rod anode vertically into a hollow, porous cylindrical container (tea strainer; mean ID=4 cm, height=8 cm) the inside surface of which had been lined with a porous paper filter and then filled with reagent grade, powdered CaCO$_3$. This anode container was then submerged in a glass beaker containing 300 mls of local (Santa Cruz, Calif.) seawater. The anode container was positioned such that the upper surface of the CaCO$_3$ mass was just above the seawater, while the vertical anode penetrated into the mass such that about 1 cm of the anode was below the seawater level, the submerged part of the anode thus being completely encased by a seawater-saturated carbonate "paste." An equivalent, naked graphite rod (cathode) was placed vertically into the solution at a distance of about 4 cm from the anode at equivalent seawater depth outside of the anode container. The initial pH of the seawater solution was then measured using a calibrated pH probe (Oakton Model 300).

The anode was then connected to the positive lead and the cathode to the negative lead of a DC power source providing a measured voltage through the cell that ranged from 3.5 to 3.6 V at 6.4 to 7.0 mA. Over 1.5 hrs of electricity application the pH of the solution rose to a value of 9.05 while electricity was temporarily turned off and after gentle stirring of the seawater to reduce chemical heterogeneity, thus determining true bulk solution pH.

The electricity was then permanently turned off, the electrodes and anode container removed from the seawater, and the solution poured into a shallow dish (11 cm ID). The pH of the solution was then periodically monitored and was observed to return to near its initial value over the course of 5 days (FIG. 5). The experiment was repeated without the presence of CaCO$_3$ and paper filter (experimental control), with a maximum pH of 8.35 being obtained, followed by a return to pH values near that of the initial seawater (FIG. 5).

It was concluded that the rise in pH observed in both treatments was the consequent of the reduction and loss from solution of hydrogen at the cathode and the production of mineral hydroxide at the anode. Because of the direct, linear relationship between pH and log [OH$^-$], the [OH$^-$] in the seawater is calculated to have increased by 25.7 μmoles/L in the carbonate treatment while it increased by only about 3.4 μmoles/L in the control (FIG. 5). In the latter treatment the OH$^-$ generated is presumed to have been balanced by Na$^+$ from the splitting of seawater NaCl, whereas Ca$^{2+}$ from the splitting of CaCO$_3$ is presumed to balance the additional OH$^-$ generated in the carbonate treatment. Evidence of NaCl splitting was indicated by the odor of Cl$_2$ in both treatments. The decrease in pH following the termination of electricity input in both treatments is consistent with the excess OH$^-$ reacting with CO$_2$ that slowly diffused in from the overlying air to form primarily HCO$_3^-$ balanced by the excess Ca$^{2+}$ and/or Na$^+$. The greater decline in pH in the carbonate treatment (FIG. 5) indicates that significantly greater absorption of CO$_2$ was obtained by this treatment than in the control.

Figure 6:
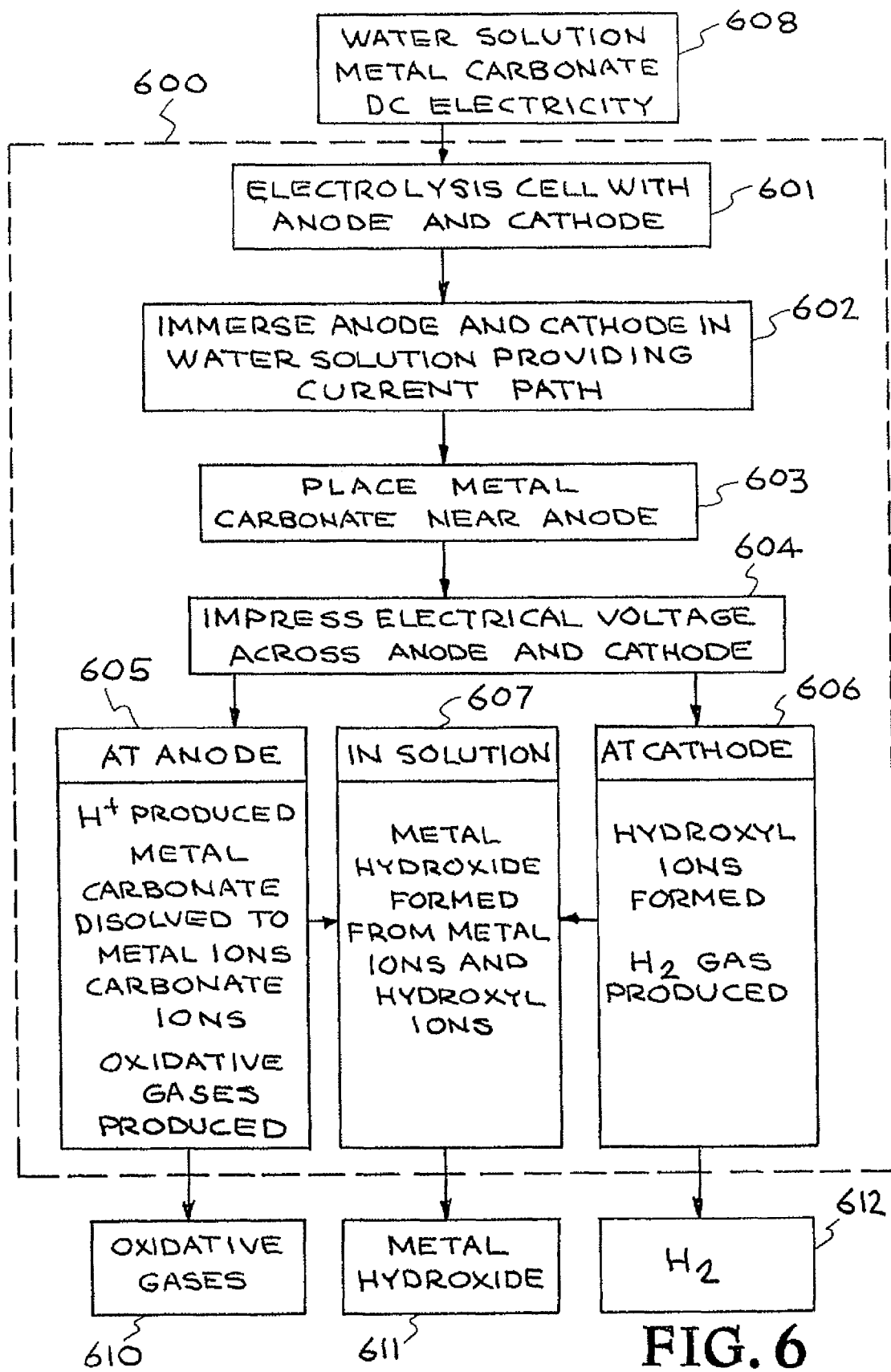
FIG. 6 is flow chart illustrating of one embodiment of a system constructed in accordance with the present invention.

Referring now to FIG. 6, a flow chart illustrates one embodiment of a system constructed in accordance with the present invention. The system is designated generally by the reference numeral 600. The system 600 provides an electrochemical system for splitting of metal carbonate, for example calcium carbonate as contained in natural minerals such as limestone, and forming dissolve metal hydroxide. Such hydroxides have wide use in various industrial, chemical, manufacturing, agricultural, aquacultural, and environmental processes. For example, such hydroxides can be used as a chemical feedstock, used for control or neutralization of acidity, and used for effecting the flocculation and precipitation of carbonates or other compounds. In one embodiment the invention employs such hydroxide for absorbing, neutralizing, and storing carbon dioxide or other acid gases.

The system 600 provides a method of forming metal hydroxide in the course of electrolyzing a water solution. The method includes a number of individual steps resulting in the production of hydroxides together with H$_2$ and oxidative gases. The method 600 begins by providing water solution, metal carbonate, and DC electricity 608 to a water electrolysis cell having an acid-producing anode, a hydroxyl-producing cathode, Step 601. In Step 602 the hydroxyl-producing cathode and the acid-producing anode are immersed in the water solution whose ion concentration is sufficient to provide a current path between the hydroxyl-producing cathode and the acid-producing anode. In Step 603 the metal carbonate is placed near or around the acid-producing anode. In Step 604 DC electricity is impressed across the acid-producing anode and the hydroxyl-producing cathode of sufficient voltage and current to generate acidity (H$^+$) at the anode and the production of oxidative gases 610 such as O$_2$ and/or Cl$_2$ (Step 605). The production of acidity near the anode leads to the dissolution of the metal carbonate into metal and carbonate ions (Step 605). Simultaneously, hydroxyl ions and hydrogen gas 612 are produced at the cathode (Step 606). In the cell solution the hydroxyl ions combine (Step 607) with the metal ions to produce metal hydroxide 611. The metal hydroxide, hydrogen, and oxidative gases either remain in the cell or are removed for external use, storage, or disposal.

Figure 7:
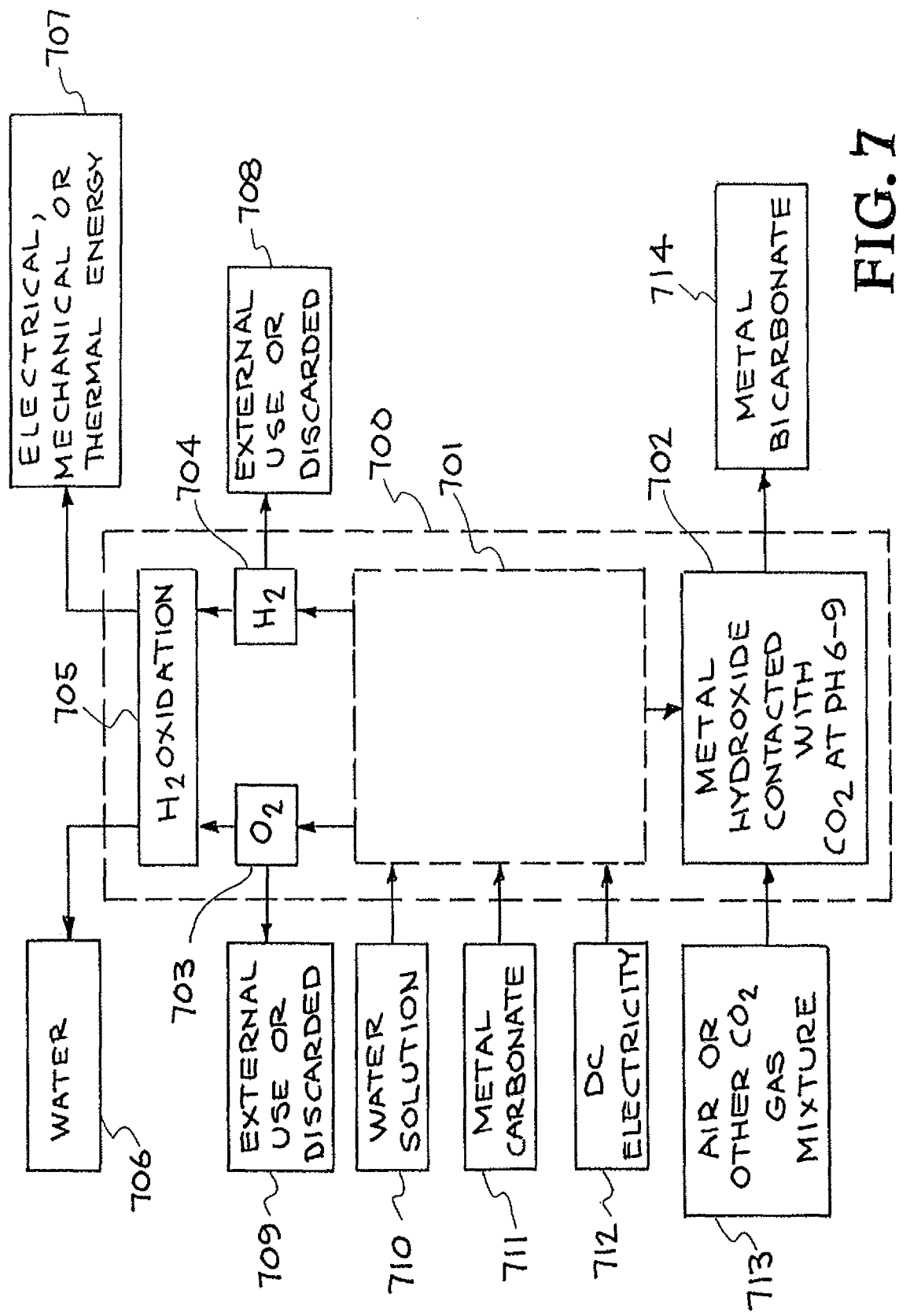
FIG. 7 is flow chart illustrating of another embodiment of a system constructed in accordance with the present invention.

Referring now to FIG. 7 a flow chart illustrates another embodiment of a system constructed in accordance with the present invention. The system is designated generally by the reference numeral 700. The system 700 provides a method for removing carbon dioxide from the atmosphere or other gas mixture while also producing either 1) hydrogen and oxidative gases, or 2) energy and oxidized hydrogen compounds. System 700, contains a system 701 that performs as the system shown in FIG. 6. Water solution 710, metal carbonate 711, and DC electricity 712 are inputs to the system 701.

In the embodiment now being described the metal hydroxide produced by System 701 is contacted with air or other gas mixture (713) to chemically react with and remove some or all of the CO$_2$ contained in air or gas mixture (Step 702), thus forming metal salts. In this example the CO$_2$ reacts with the dissolved metal hydroxide to form metal bicarbonate (714) when solution pH is maintained between 6 and 9. The formation of metal carbonate will dominate at pH greater than 9. The metal carbonate or bicarbonate formed may remain in System 700 or may be removed for use, storage, or may be discarded. By analogy it is understood that the preceding system is relevant for absorbing and neutralizing other gases whose hydrated or unhydrated forms can react with metal hydroxide to form metal salts of those gases. Such gases include SO$_2$, H$_2$S, and NO$_2$.

The hydrogen (704) and oxidative gases (703; in this example O$_2$) produced by System 701 may remain within System 700 or may be removed for external use, storage, or may be discarded 709. In another embodiment the hydrogen is oxidized in a fuel cell or internal combustion engine (Step 705) within System 700 to produce electrical, mechanical, and/or thermal energy (707) and oxidized hydrogen, in this example water (H$_2$O) 706. The oxidant used in Step 705 may be the oxidative gases (703) produced by System 701 or may be supplied by an external source. In this example the oxidant is O$_2$ produced by System 701. System 700 therefore has the ability to couple acid gas mitigation (e.g., $CO_2$ mitigation) either with hydrogen and oxidative gas production (e.g., $O_2$ production), or with energy and oxidized hydrogen production (e.g., $H_2O$ production).

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An apparatus for forming metal hydroxide, comprising:
a hydroxyl-producing cathode;
an acid-producing anode;
a DC electricity source connected to said hydroxyl-producing cathode and said acid-producing anode, said power source capable of producing a DC electric current path between said hydroxyl-producing cathode and said acid-producing anode;
a metal carbonate mass positioned near or around said acid-producing anode;
a water solution into which the said acid-producing anode and said hydroxyl-producing cathode are at least partially submerged, said water solution having a sufficient ion concentration to allow said DC electric current to pass in said electric current path between said acid-producing anode and said hydroxyl-producing cathode; and
wherein said DC electric current is of sufficient voltage to electrochemically split water, generating hydroxyl ions at said hydroxyl-producing cathode and generating acid at said acid-producing anode, said acid being of sufficient concentration to dissolve at least some of said metal carbonate mass into metal ions and carbonate ions, and wherein said metal ions travel toward said hydroxyl-producing cathode and form metal hydroxide, and wherein said carbonate ions travel toward said acid-producing anode and form carbonic acid or carbon dioxide and water or carbonic acid and carbon dioxide and water.

2. The apparatus of claim 1 where said metal carbonate mass is a metal carbonate mass that is insoluble or sparingly soluble in said water solution prior to introduction of said electric current.

3. The apparatus of claim 2 where said metal carbonate mass is a calcium carbonate mass or a magnesium carbonate mass, said calcium carbonate mass or a magnesium carbonate mass being manufactured or as contained in or derived from limestone or dolomite.

4. The apparatus of claim 1 further comprising a unit for positioning of said metal carbonate mass around or near said acid-forming anode and wherein said unit for positioning of said metal carbonate mass around or near said acid-forming anode is a porous container that holds said metal carbonate mass, said porous container being composed at least partially of a material that allows said water solution and said metal ions to pass into and out of the interior of said porous container, said material being a membrane, cloth, matrix, grate, filter, sieve, web, or screen.

5. The apparatus of claim 1 where said water splitting results in hydrogen gas being produced at said hydroxyl-producing cathode, and where said hydrogen gas is used as a chemical feed stock, is used as a fuel in a hydrogen oxidizing apparatus to produce energy and oxidized hydrogen, or is stored or discarded.

6. The apparatus of claim 5 where said oxidizing apparatus is a fuel cell or internal combustion engine.

7. The apparatus of claim 5 further comprising an oxidant in said oxidizing apparatus and wherein said oxidant is oxygen or chlorine gas, and wherein the said oxidized hydrogen is water or hydrochloric acid.

8. The apparatus of claim 7 where the said oxidant is produced by the said acid-producing anode in said apparatus of claim 1.

9. The apparatus of claim 5 where said energy is electrical energy, or mechanical energy, or electrical energy or a combination of electrical, mechanical, and thermal energy.

* * * * *